April 4, 1939.   H. B. WENTWORTH   2,152,939
DEHYDRATING APPARATUS
Filed Dec. 1, 1937   3 Sheets-Sheet 1
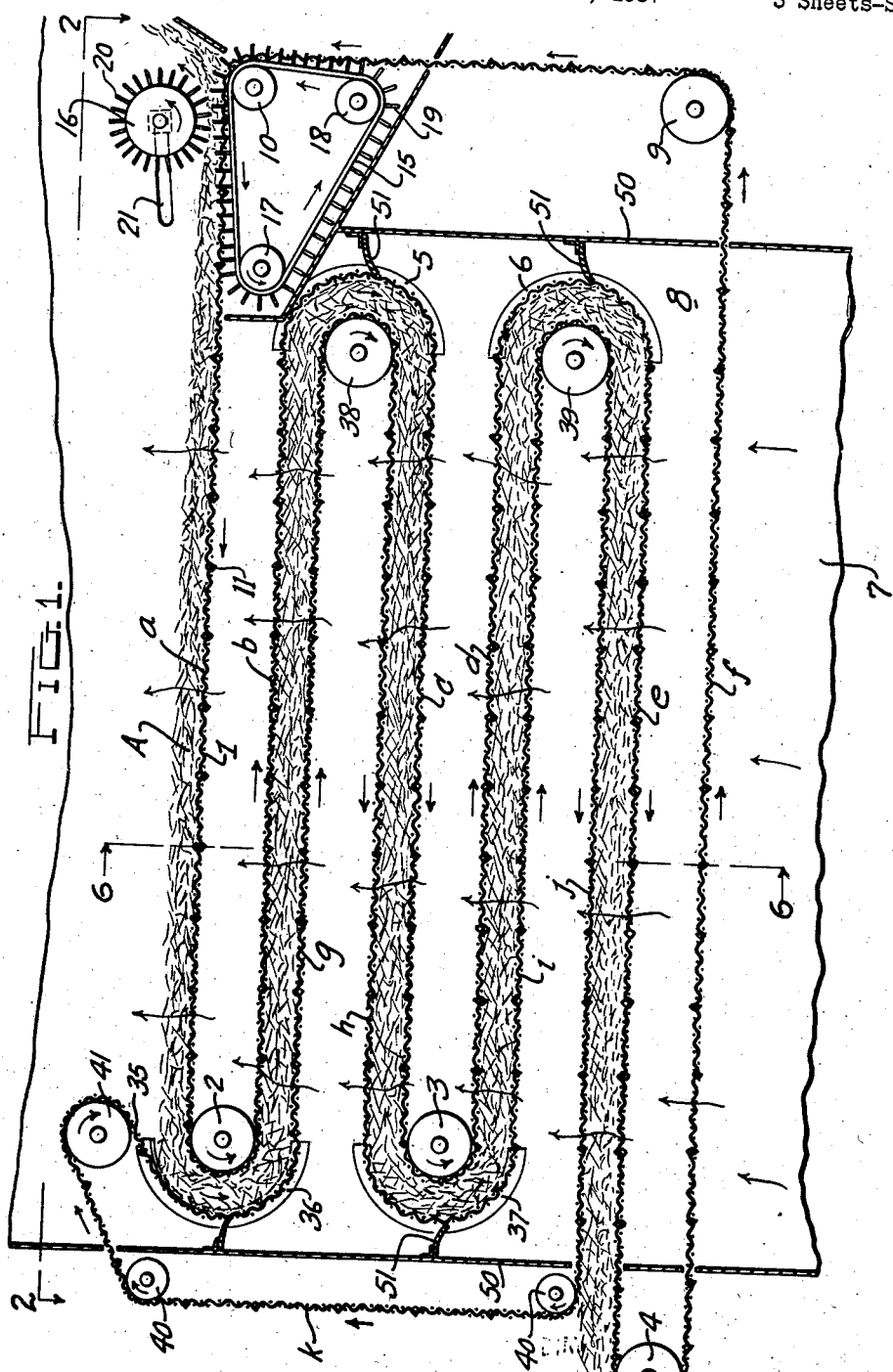
INVENTOR
Herbert B. Wentworth
BY
ATTORNEYS.

April 4, 1939.  H. B. WENTWORTH  2,152,939
DEHYDRATING APPARATUS
Filed Dec. 1, 1937  3 Sheets-Sheet 2
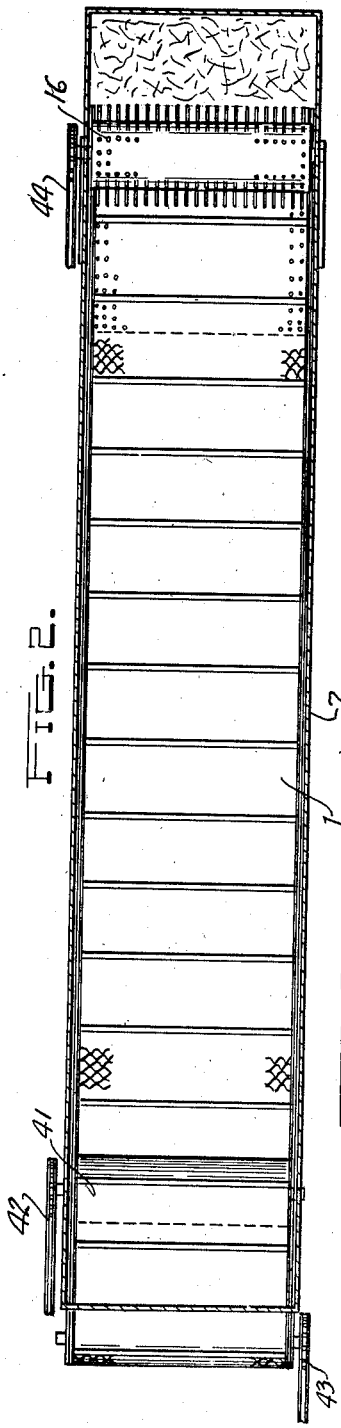
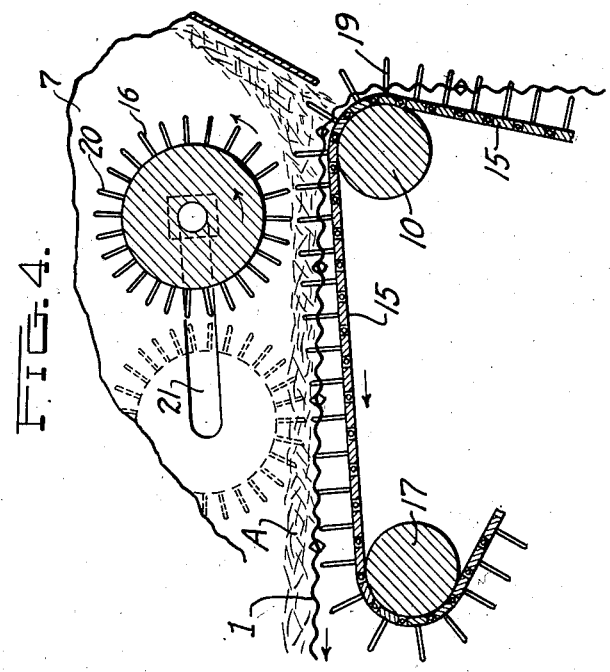
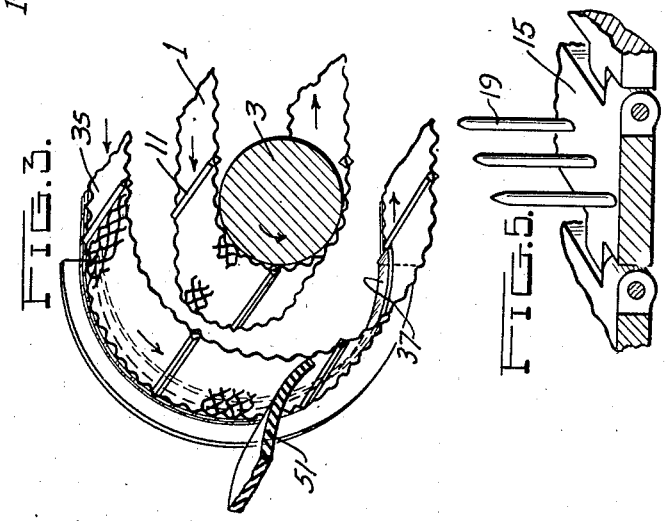
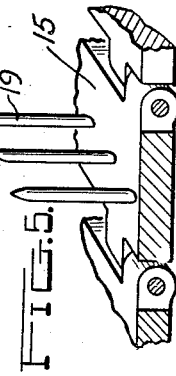
INVENTOR
Herbert B. Wentworth
BY *Owen & Owen*
ATTORNEYS.

April 4, 1939.　　　H. B. WENTWORTH　　　2,152,939
DEHYDRATING APPARATUS
Filed Dec. 1, 1937　　　3 Sheets-Sheet 3
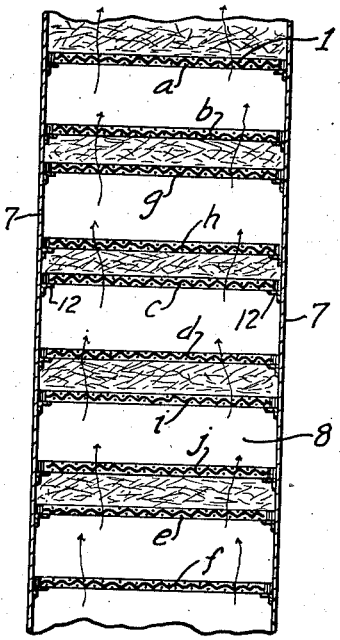
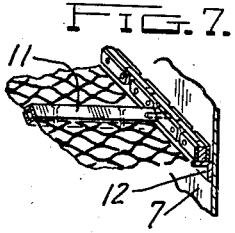
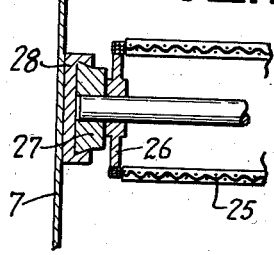
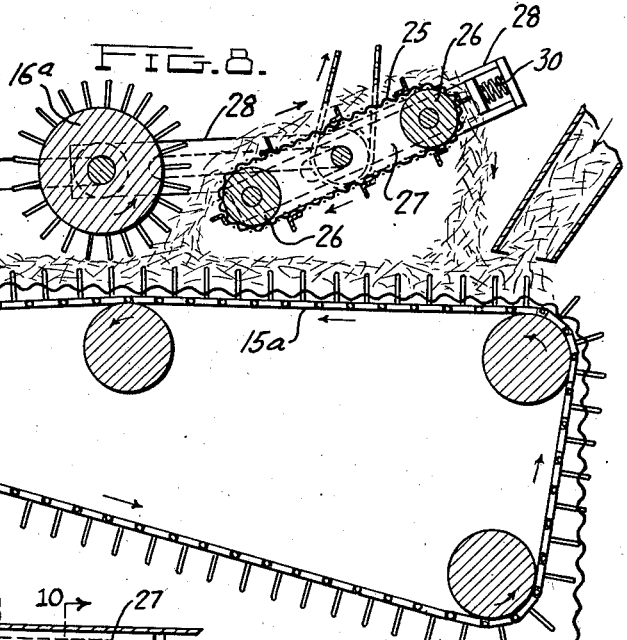
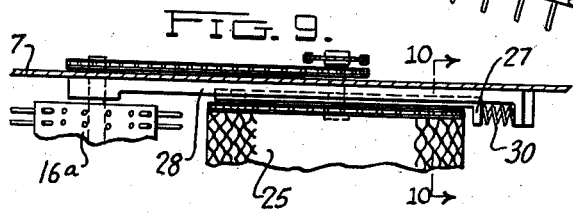
INVENTOR
Herbert B. Wentworth
BY
ATTORNEYS Patented Apr. 4, 1939

2,152,939

UNITED STATES PATENT OFFICE 2,152,939

DEHYDRATING APPARATUS

Herbert B. Wentworth, Erie, Mich.

Application December 1, 1937, Serial No. 177,605

9 Claims. (Cl. 198—165)

This invention relates to apparatus for extracting moisture from alfalfa, grasses, beet pulp, and the like, and particularly to such apparatus wherein the treated material is carried on a conveyor belt during the drying operation and the drying air or other medium is directed therethrough.

In the efficient use of apparatus of this character, it is important to distribute the material on the conveyor belt in the form of a column or layer of uniform depth throughout its length and width and of a thickness to permit the drying air to be freely circulated therethrough.

An object of the invention is the provision, in an apparatus of this class, of simple and efficient means for conveying material in layer form of predetermined thickness backward and forward through a drying chamber without disturbing the thickness or continuity of the layer.

Another object is the provision, in an apparatus of this character, of simple and efficient means for distributing the material in predetermined uniform thickness on the conveyor to suit the nature of the material and its moisture content.

Further objects and advantages of the invention will be apparent from the following detailed description, and from the accompanying drawings, in which—

Figure 1 is a somewhat diagrammatical vertical sectional view of the means embodying the invention, with the section taken lengthwise of the runs of the conveyor; Fig. 2 is a horizontal section taken substantially on the dotted line 2 in Fig. 1; Fig. 3 is an enlarged fragmentary sectional view in perspective of a conveyor belt guiding portion of the invention; Fig. 4 is an enlarged fragmentary sectional detail similar to Fig. 1 of the means employed for gauging the thickness of the material layer on the conveyor; Fig. 5 is an enlarged fragmentary perspective of a portion of the depth gauge belt shown in Fig. 4; Fig. 6 is a vertical cross-section on the line 6—6 in Fig. 1; Fig. 7 is an enlarged fragmentary detail of a portion of the conveyor belt and its guiding coaction with the wall of the chamber in which disposed; Fig. 8 is an enlarged fragmentary sectional view of a modified form of the depth gauging and stripping means for determining the thickness of the material layer on the conveyor; Fig. 9 is a fragmentary horizontal sectional view thereof, and Fig. 10 is an enlarged sectional detail on the line 10—10 in Fig. 9.

Referring to the drawings, 1 designates an endless conveyor belt of open mesh top, such for instance as woven wire fabric belting, that has a top run $a$ and a plurality of successive runs therebelow indicated, in the present instance, as $b$, $c$, $d$, $e$ and $f$, being guided from one run to another at one end by rolls 2, 3 and 4, and at the other end by curved guides 5 and 6. Said rolls and guides extend between the side walls 7 of a chamber 8 in which the conveyor is disposed, the roll shafts being journaled in such side walls. The bottom run $f$ at the opposite end thereof to roll 4 passes to the material-receiving end of the run $a$ around rolls 9 and 10. The belt 1 is provided at spaced intervals therearound with cross-cleats 11, and the ends of these preferably rest on guide rails 12 secured to the side walls 7 (Fig. 6), thus preventing sagging of the runs intermediate their ends.

The material to be dried is delivered to the receiving end of the top run $a$ of the belt in any suitable manner, as by a spout traveling back and forth across the belt, or otherwise, as well understood in the art.

The thickness of the layer of material A on the belt is determined by the cooperative action of a depth guage belt 15 and stripper wheel 16. The belt 15 is substantially the width of the conveyor belt 1 and passes over the guide roll 10 under the belt 1 and thence around idler guide rolls 17 and 18. The belt 15, in its present embodiment, is composed of a plurality of successively arranged cross bars, each having a cross row of pins 19 projecting outward therefrom and adapted to enter and project through registering mesh openings in the belt 1 as the belts approach each other on their upward runs and pass over the roll 10, and to gradually recede from the belt 1 during the travel between the rolls 10 and 17.

For this purpose, the roll 17 is lowered with respect to the roll 10, so that the top run of the gauge belt 15 is on a downward incline from the roll 10 and from the plane of travel of the adjacent portion of the belt 1. The roll 10 is also preferably set inward a distance from the vertical end run of the belt 1 a distance so that the pins 19 will enter the meshes of the belt after passing to the outer vertical side of the roll. The length of the pins 19 depends largely on the maximum depth of material to be run over the belt, and while it is thought that for most uses a six inch length of pin would be suitable, such length may be varied as desired.

The stripper member 16 which, in the present instance, is in the form of a wheel, is disposed above the receiving end of the conveyor belt 1 over the gauge belt 15 and has its periphery provided with a multiplicity of radially projecting pins 20, which, when the wheel is rotated in the direction indicated by the arrow in Figs. 1 and 4, engage the material about a half inch above the adjacent ends of the gauge pins 19 and throw the surplus material back, thus causing a layer of material of constant predetermined depth to be supplied to the conveyor. The stripper wheel 16 is adjustable lengthwise of the conveyor in a plane parallel to that of the top run of the gauge belt 19, so that when the wheel is moved lengthwise of the conveyor over the gauge belt 15 it will maintain its spacing with the belt pins 19 and strip the material from the conveyor belt at a greater or less depth, depending on the space between the wheel pins and the conveyor belt. For the purpose of such adjustment, the bearings for the wheel shaft may be adjustable lengthwise of the conveyor in inclined slots 21 provided in the chamber walls 7. The wheel is shown in dotted lines in Fig. 4 as disposed at the forward ends of such slots.

In Fig. 8 is shown a slightly modified form of the depth gauging and stripper means. In this form the stripper wheel is further advanced from the receiving end of the conveyor and depth gauge belts than in Figs. 1 and 4, and has means associated therewith for receiving the surplus material that is thrown back by the wheel and to deliver such material a distance back from the wheel where it may again fall on the conveyor belt. In this form of the invention, 1ᵃ represents the conveyor belt, 15ᵃ the depth gauge belt, and 16ᵃ the stripper wheel. The guide wheels for the gauge belt are so disposed that such belt has a short run parallel to the run of the belt 1ᵃ at the receiving end thereof and then recedes on a gradual decline from the conveyor belt, the stripper wheel 16ᵃ being adjustable longitudinally over the declining run portion of the gauge belt. An apron type conveyor 25 is disposed at the rear of the stripper wheel 16ᵃ, being guided by rolls 26 mounted at their ends in bars 27 which are mounted for longitudinal sliding movements in side frame bars 28 that are rigidly connected to the bearings of the wheel 16ᵃ for adjustment therewith in the side wall slots 21ᵃ. The bars 27 are yieldingly held at the forward ends of their movements with respect to the bars 28 by coiled springs 30, such springs yielding and permitting rearward movement of the conveyor 25 and its guide rolls should any clogging of material tend to occur between the stripper wheel and said conveyor.

In order to maintain the material layer A in substantially undisturbed form while passing around the end guide means for the conveyor, and while the material is at the under side of the belt during the runs b and d, a second conveyor belt 35 is provided. This belt has successive horizontally disposed runs g, h, i and j, with the runs g and i disposed under the respective runs b and d of the conveyor belt 1, and with the runs h and j disposed over the respective runs c and e of the belt 1 with the spacing between the associated belt runs substantially the same as the thickness of the material column A. The belt 35 is also spaced outwardly at the ends of its runs from the guide rolls 2 and 3 by the curved guides 37, and from the curved guides 5 and 6 by the inwardly spaced guide rolls 38 and 39, with the spacing corresponding to the depth of the material column, as clearly shown by Fig. 1. The belt 35 has a vertical run k at one end which passes up around guide rolls 40 and 41, the latter being disposed over the forward end of the top run a of the conveyor belt 1.

The various belts are driven in any suitable manner, as for instance by a chain drive, to one or more of the guide rolls 2, 3, 4, 9, 10, of the conveyor belt 1 and to one or more of the guide rolls 38, 39, 40, 41, for the conveyor belt 35. In Fig. 2, 42 designates a chain drive to the guide roll 41, 43 designates a chain drive to the guide roll 4, and 44 designates a chain drive to the stripper wheel 16 from any suitable source. The gauge belt 15 is driven with the conveyor belt 1 by the meshing engagement of the gauge pins 19 with the latter.

A current of hot air is supplied to the chamber 8 below the conveyor belts from any suitable source, and is caused to pass up through the conveyor belts and material carried thereby by the confining action of end partitions 50 and flexible wiper strips 51 extending from said partitions and coacting with the respective curved run connecting portions of the conveyor belts 1 and 35, as shown in Fig. 1.

It is apparent from the foregoing that the conveyor belts 1 and 35 and gauge belt 15 are driven at the same speed; that the material to be dried is fed from any suitable source to the receiving end of the top run a of the conveyor belt 1 and is delivered to said belt in a column of uniform depth by the cooperative action of the gauge belt 15 and stripper wheel 16; that said column remains substantially intact through the successive horizontal runs of the conveyor belt 1 and during the shifting from one run to another by the action of the companion conveyor belt 35, and that the material is finally delivered in thoroughly dried manner from the delivery end of the belt run e over the roll 4.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In an apparatus of the class described, a material conveying belt having openings therein, a gauge belt movable with said first belt and having pins projecting outward therefrom and through the openings in said first belt during a predetermined portion of its run to gauge the depth of material supplied to the first belt and thence to recede therefrom, means for guiding said belt, and means for acting on the material at the outer ends of said pins to strip surplus material from the first belt.

2. In an apparatus of the class described, a material conveyor belt guided to have a predetermined run and having openings therein, a gauge belt movable with said first belt and guided to have a portion of its run in adjacent relation to said first belt at the inner side thereof during a predetermined portion of its run and then to recede therefrom, said gauge belt having pins projecting from its outer side and adapted to mesh with and project through said belt openings and beyond the outer side thereof during the portion of the gauge belt run adjacent to the first belt to gauge the depth of material supplied to the first belt, and means for stripping surplus material from said first belt at the outer ends of said pins.

3. In an apparatus of the class described, a conveyor belt to which material is delivered and having openings therein, guide means for said belt, a material depth gauge belt disposed below said first belt adjacent to the point of delivery of material thereto and having gauge pins projecting outward therefrom and through the openings in said first belt at said adjacent point and to then recede from the belt, and means disposed at the opposite side of the first belt to the gauge belt and cooperating with its pins to move a predetermined depth of material on the first belt.

4. In an apparatus of the class described, an open mesh form of conveyor belt to which material is delivered at a predetermined point in its run, guide means for said belt, a gauge belt having a plurality of pins projecting outward therefrom, said gauge belt being guided for movement at the inner side of said conveyor belt adjacent to said delivery point and having a portion of its run in which the pins mesh with and project a maximum extent through mesh openings in the conveyor belt and then recede therefrom, and means operable over said first belt in cooperation with said pins to gauge the depth of material delivered to the conveyor belt and to strip surplus material therefrom.

5. In an apparatus of the class described, an open mesh conveyor belt having a portion of its run adjacent to a material receiving point, guide means for said belt, a gauge belt passing around a portion of said gauge means in coaction with the inner side of said conveyor belt and having pins projecting outwardly from its outer side and through registering openings in said conveyor belt at the point of engagement of said belts and then receding therefrom, said pins projecting a distance beyond the outer side of the conveyor belt to gauge the depth of material delivered thereto, and means operable over and in spaced relation to the conveyor belt and projecting pins to strip surplus material from the conveyor belt over said pins.

6. In an apparatus of the class described, a conveyor belt and a gauge belt disposed one within the other, the gauge belt having portions meshing with and projecting through and beyond the conveyor belt at a predetermined point in its movement and means cooperating with said portions, and material stripping means cooperating with said portions to gauge the depth of material delivered to said conveyor belt.

7. In an apparatus of the class described, an endless conveyor belt, guide means for said belt, a second endless belt disposed within said first belt and having a portion of its run in meshing engagement with said conveyor belt with the meshing portion of the former projecting through the conveyor belt adjacent the point of delivery of material thereto to gauge the depth of the material strip on the conveyor, means guiding said second belt and having a part in common with said first guide means, and means cooperating with said second belt at the outer side of the first belt to maintain at a predetermined depth the material delivered to said first belt.

8. In an apparatus of the class described, an endless conveyor belt, guide means for said belt, a second endless belt disposed within said first belt and having a portion of its run in meshing engagement with said conveyor belt with the meshing portion of the former projecting through the conveyor belt adjacent the point of delivery of material therethrough to gauge the depth of the material strip on the conveyor, means guiding said second belt and having a part in common with said first guide means, and a stripper wheel operating without the first belt in opposition to said second belt to cooperate with the latter to determine the depth of material delivered to the first belt.

9. In an apparatus of the class described, a material conveyor guided to have continuous superposed backward and forward run portions, means operable to gauge the depth of material delivered to an upper run portion of the conveyor whereby the material will travel in continuous column form with the conveyor to a delivery point, and a second conveyor guided to follow the circuitous course of the first conveyor for a predetermined distance in constant spaced parallel relation thereto to cooperate with the first conveyor to maintain the material column substantially intact throughout its run with the conveyors in the space provided therebetween.

HERBERT B. WENTWORTH.